United States Patent
Bhat et al.

(10) Patent No.: US 11,789,674 B2
(45) Date of Patent: Oct. 17, 2023

(54) ORPHANED PRINT JOB RENEWAL

(71) Applicant: Hewlett-Packard Development Company, L.P., Spring, TX (US)

(72) Inventors: Jayalakshmi Manjunath Bhat, Bangalore (IN); Divya Bidarakatte Nanjarangalah, Bangalore (IN); Deb Rupam Banerjee, Bangalore (IN); Poornima Angadi Hiremath, Bangalore (IN); Lakshmi venkataswamy Setty, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/593,598

(22) PCT Filed: Feb. 19, 2020

(86) PCT No.: PCT/US2020/018722
§ 371 (c)(1),
(2) Date: Sep. 21, 2021

(87) PCT Pub. No.: WO2021/167597
PCT Pub. Date: Aug. 26, 2021

(65) Prior Publication Data
US 2022/0382489 A1 Dec. 1, 2022

(30) Foreign Application Priority Data
Apr. 18, 2019 (IN) .............................. 201941015584

(51) Int. Cl.
*G06F 3/12* (2006.01)

(52) U.S. Cl.
CPC ............ *G06F 3/122* (2013.01); *G06F 3/1238* (2013.01); *G06F 3/1267* (2013.01)

(58) Field of Classification Search
None
See application file for complete search history.

(56) References Cited

U.S. PATENT DOCUMENTS

| 6,667,810 | B1 | 12/2003 | Jeyachandran et al. |
| 7,719,708 | B2 | 5/2010 | Ferlitsch et al. |
| 9,218,145 | B2 | 12/2015 | Stone et al. |
| 9,225,675 | B2 | 12/2015 | Patiejunas et al. |
| 9,524,127 | B2 | 12/2016 | Csurka et al. |
| 2005/0100378 | A1 | 5/2005 | Kimura et al. |

(Continued)

FOREIGN PATENT DOCUMENTS

| JP | 2008-217718 A | | 9/2008 |
| JP | 2008217718 A | * | 9/2008 |
| JP | 2014191371 A | | 10/2014 |

OTHER PUBLICATIONS

English translation of JP-2008217718-A. (Year: 2008).*

*Primary Examiner* — Thomas D Lee
(74) *Attorney, Agent, or Firm* — Brooks, Cameron & Huebsch, PLLC

(57) ABSTRACT

Examples disclosed herein relate to determining whether a stored print job is potentially orphaned, and, in response to determining that the stored print job is potentially orphaned, requesting a renewal from a user associated with the stored print job and deleting the stored print job if no renewal is received within a configurable time period.

15 Claims, 3 Drawing Sheets

(56) References Cited

U.S. PATENT DOCUMENTS

| | | | |
|---|---|---|---|
| 2006/0221375 A1* | 10/2006 | Nagarajan | G06F 3/1222 358/1.14 |
| 2008/0055641 A1* | 3/2008 | Murata | G06F 3/1285 358/1.15 |
| 2008/0244756 A1 | 10/2008 | Kitada | |
| 2016/0085493 A1 | 3/2016 | Kaneko | |
| 2016/0162225 A1 | 6/2016 | Ding et al. | |
| 2018/0203649 A1 | 7/2018 | Ramakrishnan et al. | |

* cited by examiner

ORPHANED PRINT JOB RENEWAL

BACKGROUND

Multi-function devices often combine different components such as a printer, scanner, and copier into a single device. Such devices frequently receive refills of consumables, such as print substances (e.g., ink, toner, and/or additive materials) and/or media (e.g., paper, vinyl, and/or other print substrates).

Figure 1:
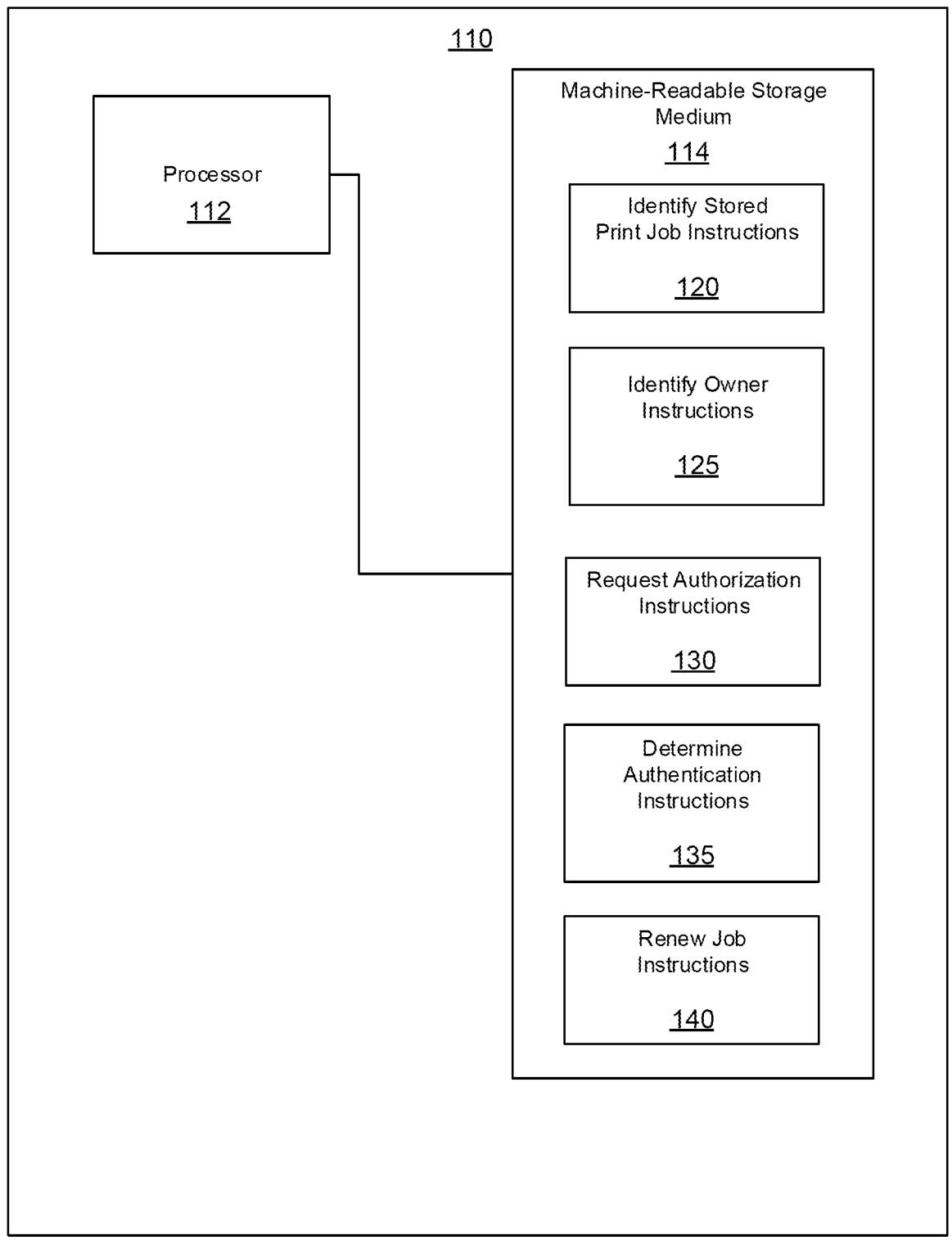
FIG. 1 is a block diagram of an example computing device for providing orphaned print job renewal.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations consistent with the description; however, the description is not limited to the examples and/or implementations provided in the drawings.

DETAILED DESCRIPTION

Most multi-function-print devices (MFPs) provide several features, such as an option to scan a physical document, which may be controlled via an on-device control panel, a connected application, and/or a remote service. Other options may include printing, copying, faxing, document assembly, etc. The scanning portion of an MFP may comprise an optical assembly located within a sealed enclosure. The sealed enclosure may have a scan window through which the optical assembly can scan a document, which may be placed on a flatbed and/or delivered by a sheet feeder mechanism.

Some MFPs offer the option to store print jobs until a user is ready to print them, such as when the user is standing at the print device. This allows the user to immediately retrieve print jobs once they are complete, which may be important for print jobs that contain sensitive and/or private information. Sometimes, however, these print jobs may not be printed and may remain stored. This consumes available memory space, whether the print job is stored on the MFP itself or in a remote storage location (e.g., a cloud server).

These unprinted stored jobs may be referred to as orphaned print jobs, as they may have been forgotten about and/or no longer needed. Typically, these print jobs can remain stored for extended periods of time, consuming memory and increasing the time it takes to look up other print jobs by unnecessarily increasing the size of a print job index. If a user has forgotten the job, they will not go in and manually delete these orphaned print jobs, so the stored print jobs will continue to reduce efficiency, often until a reset is manually performed to clear all stored print jobs.

In some implementations described herein, a processor may execute instructions to identify a stored print job as potentially orphaned, identify an owner of the stored print job, request authorization from the owner to renew the stored print job, and in response to receiving authorization from the owner to renew the stored print job, determine whether the authorization from the owner is authenticated, and in response to determining that the authorization from the owner is authenticated, renew the stored print job.

In some implementations described herein, a method may be performed by determining whether a stored print job is potentially orphaned, and, in response to determining that the stored print job is potentially orphaned, requesting a renewal from a user associated with the stored print job and deleting the stored print job if no renewal is received within a configurable time period.

In some implementations described herein, a system may comprise a storage engine to store a print job comprising a plurality of job attributes, wherein the plurality of job attributes comprise a job owner identification, an authentication code, and a renewal option. The system may further comprise a renewal engine to identify the stored print job as potentially orphaned according to the renewal option, request a renewal from a user associated with the stored print job according to the job owner identification, determine whether the renewal received from the user associated with the stored print job is authenticated according to the authentication code, and in response to determining that the renewal received from the user associated with the stored print job is authenticated according to the authentication code, renew the stored print job.

FIG. 1 is a block diagram of an example computing device 110 for providing orphaned print job renewal. Computing device 110 may comprise a processor 112 and a non-transitory, machine-readable storage medium 114. Storage medium 114 may comprise a plurality of processor-executable instructions, such as instructions 120 and instructions 125. In some implementations, instructions 120, 125 may be associated with a single computing device 110 and/or may be communicatively coupled among different computing devices such as via a direct connection, bus, or network.

Processor 112 may comprise a central processing unit (CPU), a semiconductor-based microprocessor, a programmable component such as a complex programmable logic device (CPLD) and/or field-programmable gate array (FPGA), or any other hardware device suitable for retrieval and execution of instructions stored in machine-readable storage medium 114. In particular, processor 112 may fetch, decode, and execute identify stored print job instructions 120, identify owner instructions 125, request authorization instructions 130, determine authentication instructions 135, and renew job instructions 140.

Executable instructions 120, 125, 130, 135, 140 may comprise logic stored in any portion and/or component of machine-readable storage medium 114 and executable by processor 112. The machine-readable storage medium 114 may comprise both volatile and/or nonvolatile memory and data storage components. Volatile components are those that do not retain data values upon loss of power. Nonvolatile components are those that retain data upon a loss of power.

The machine-readable storage medium 114 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two and/or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

Identify stored print job instructions 120 may identify a stored print job as potentially orphaned. For example, identify stored print job instructions 120 may comprise instructions to determine whether an age of the stored print job is greater than a threshold (e.g., over 30 days old). For another example, identify stored print job instructions 120 may comprise instructions to determine whether a plurality of requests for the owner to renew the stored print job have been provided to the owner without receiving the authorization from the owner (e.g., three requests for renewal have been made with no response and/or no authenticated response).

A print job may comprise a set of data (such as a document) waiting to be released for an action at a print device. For example, the stored print job may be waiting to be printed at the print device. For another example, the stored print job could be data associated with a document scan and/or copy operation being stored before the data is used to create the scan file and/or copy, respectively. Computing device 110 may comprise the print device and/or may be communicatively coupled to the print device.

The job may be stored in a native document format (e.g., a word processing document) and/or may have been rendered into a printer-specific format (e.g., Printer Command Language). The print job may comprise various metadata attributes, such as a job owner identification, an authentication code, and/or a renewal option. These attributes may comprise data about the print job but are not meant to be printed.

An orphaned print job may comprise a print job that has been stored but is no longer needed to be printed. For example, an orphaned print job may have been stored and never printed and/or a total number of specified copies may not have been printed. A stored print job may be identified as potentially orphaned based on a configurable criterion and/or plurality of criteria. The print job may be designated as potentially orphaned once these criteria have been met but before a renewal has been triggered and/or received. Such criteria may comprise, for example, an amount of time since the print job was stored, some but not all designated copies being printed, and/or a designated print device no longer being available.

In some implementations, the stored print job may comprise a document is to be released at the print device via receiving an authenticated request to print from the owner. For example, the authenticated request to print from the owner may comprise a personal identification number (PIN).

In some implementations, identify stored print job instructions 120 may comprise instructions to determine if a renewal option is associated with the stored print job. For example, the renewal option may comprise a Boolean setting such as a yes or no response to whether a request to renew should be sought. If no request to renew is to be sought, then the stored print job may be determined not to have a renewal option. For another example, the renewal option may comprise a plurality of users from whom renewal may be requested. If no users are listed, then the stored print job may be determined not to have a renewal option. In response to determining that a renewal option is not associated with the stored print job, identify stored print job instructions 120 may delete the stored print job without requesting authorization from the owner to renew the stored print job.

Identify owner instructions 125 may identify an owner of the stored print job. For example, print job metadata may identify a user by a unique identifier and/or contact information (e.g., messaging address, email, phone, etc.).

Request authorization instructions 130 may request authorization from the owner to renew the stored print job. In some implementations, the authorization from the owner to renew the stored print job may comprise the PIN to determine that the authorization from the owner is authenticated.

Determine authentication instructions 135 may determine whether the authorization from the owner is authenticated. In some implementations, determine authentication instruction 135 may comprise instructions to compare an element of the authorization to a metadata element of the stored print job. For example, the metadata may comprise a user generated code (e.g., a PIN, password, one-time use authenticator code, etc.) associated with the stored print job. To be authenticated, the authorization may comprise the PIN associated with the stored print job. In response to determining that the authorization from the owner is not authenticated, determine authentication instructions 135 may further comprise instructions delete the stored print job.

Renew job instructions 140 may in response to determining that the authorization from the owner is authenticated, renew the stored print job. A renewed print job may have its potentially orphaned status revoked and remain an active stored job available for retrieval, printing, and/or other actions.

Figure 2:
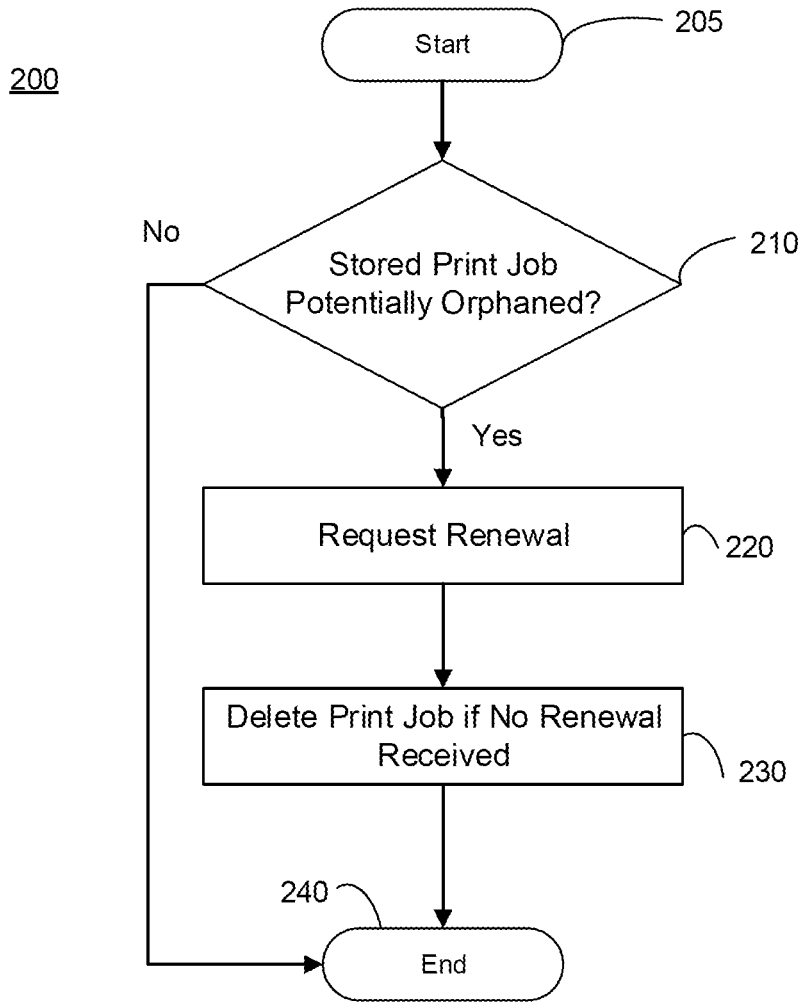
FIG. 2 is a block diagram of an example system for providing orphaned print job renewal.

FIG. 2 is a flowchart of an example method 200 for orphaned print job renewal. Although execution of method 200 is described below with reference to computing device 110, other suitable components for execution of method 200 may be used.

Method 200 may begin at stage 205 and advance to stage 210 where device 110 may determine whether a stored print job is potentially orphaned. For example, device 110 may execute identify stored print job instructions 120 to identify a stored print job as potentially orphaned.

In some implementations, determining that the stored print job is potentially orphaned may comprise determining that a date associated with the stored print job is older than a threshold age. For example, identify stored print job instructions 120 may comprise instructions to determine whether an age of the stored print job is greater than a threshold (e.g., over 30 days old).

In some implementations, determining that the stored print job is potentially orphaned may comprise determining that the stored print job is stored on a first printing device and the stored print job has been printed on a second printing device.

In some implementations determining that the stored print job is potentially orphaned may comprise determining that an allowable number of copies of the stored print job have been printed.

In response to determining that the stored print job is potentially orphaned, method 200 may then advance to stage 220 where computing device 110 may request a renewal from a user associated with the stored print job. For example, device 110 may execute identify owner instructions 125 to identify an owner of the stored print job, request authorization instructions 130 to request authorization from the owner to renew the stored print job, and/or determine authentication instructions 135 to determine whether the authorization from the owner is authenticated. For example, print job metadata may identify a user by a unique identifier and/or contact information (e.g., messaging address, email, phone, etc.). In some implementations, the authorization from the owner to renew the stored print job may comprise the PIN to determine that the authorization from the owner is authenticated.

Method 200 may then advance to stage 230 where computing device 110 may delete the stored print job if no renewal is received within a configurable time period. For example, if a renewal is not received within 24 hours, the stored print job may be deleted. In some implementation, a plurality of requests for the owner to renew the stored print job may have been provided to the owner without receiving the authorization from the owner (e.g., three requests for renewal have been made with no response and/or no authenticated response). If the renewal is received, device 110 may execute renew job instructions 140 to renew the stored print job. A renewed print job may have its potentially orphaned status revoked and remain an active stored job available for retrieval, printing, and/or other actions.

In response to determining that the stored print job is not potentially orphaned, or after deleting the stored print job in response to not receiving the renewal within the configurable time period, method 200 may end at stage 240.

Figure 3:
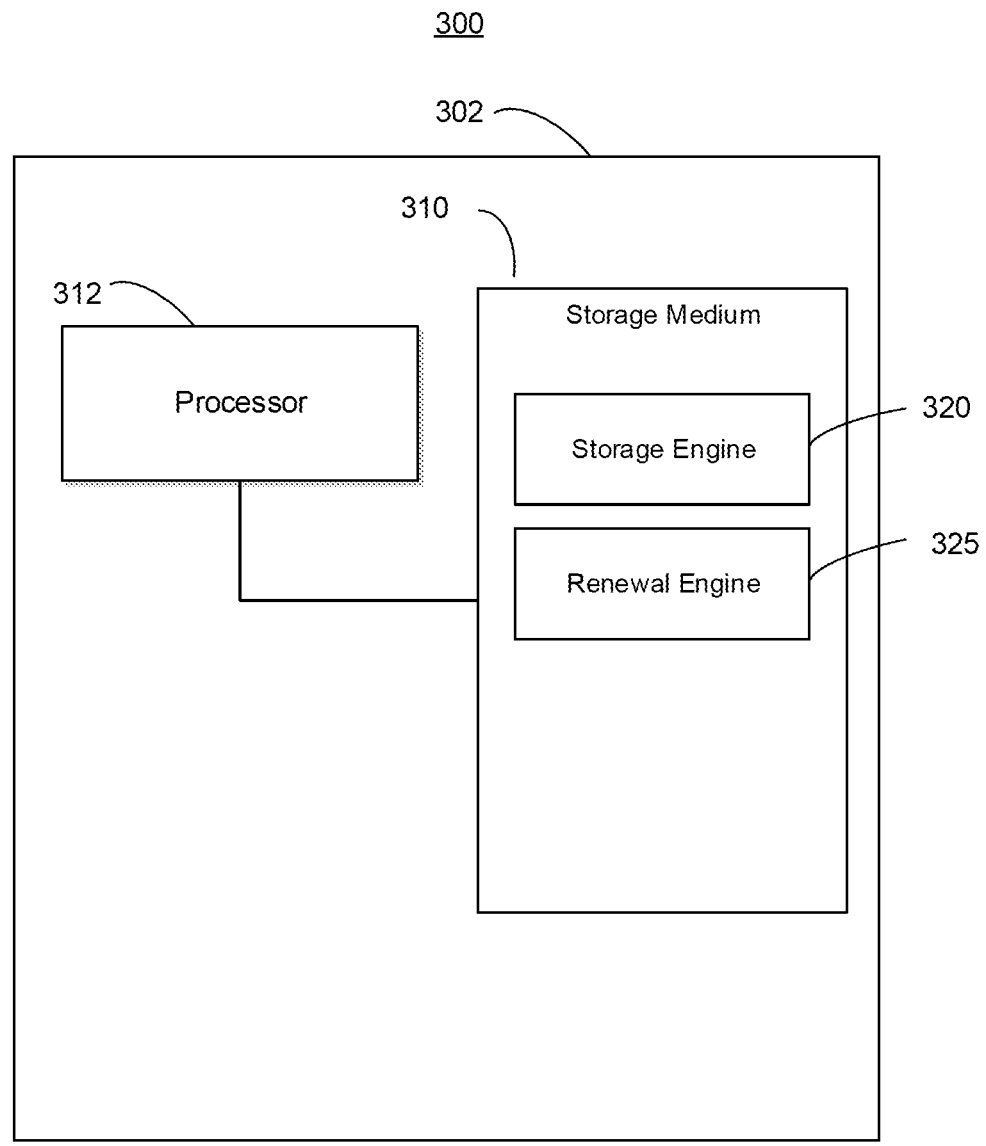
FIG. 3 is a flowchart of an example method for providing orphaned print job renewal.

FIG. 3 is a block diagram of an example apparatus 300 for providing orphaned print job renewal. Apparatus 300 may comprise a multi-function printer device 302 comprising a storage medium 310, and a processor 312. Device 302 may comprise and/or be associated with, for example, a general and/or special purpose computer, server, mainframe, desktop, laptop, tablet, smart phone, game console, printer, multi-function device, and/or any other system capable of providing computing capability consistent with providing the implementations described herein. Device 302 may store, in storage medium 310, a storage engine 320 and a renewal engine 325.

Each of engines 320, 325 may comprise any combination of hardware and programming to implement the functionalities of the respective engine. In examples described herein, such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement engines 320, 325. In such examples, device 302 may comprise the machine-readable storage medium storing the instructions and the processing resource to execute the instructions, or the machine-readable storage medium may be separate but accessible to apparatus 300 and the processing resource.

Storage engine 320 may store a print job comprising a plurality of job attributes, wherein the plurality of job attributes comprise a job owner identification, an authentication code, and a renewal option. For example, the job owner identification may identify a user by a unique identifier and/or contact information (e.g., messaging address, email, phone, etc.). The authentication code attribute may, for example, comprise a user generated code (e.g., a PIN, password, one-time use authenticator code, etc.) associated with the stored print job. The renewal option may, for example, comprise a Boolean setting such as a yes or no response to whether a request to renew should be sought. If no request to renew is to be sought, then the stored print job may be determined not to have a renewal option. For another example, the renewal option may comprise a plurality of users from whom renewal may be requested. If no users are listed, then the stored print job may be determined not to have a renewal option.

Renewal engine 325 may identify the stored print job as potentially orphaned according to the renewal option, for example, by executing identify stored job instructions 120.

Renewal engine 325 may further request a renewal from a user associated with the stored print job according to the job owner identification, for example, by executing request authorization instructions 130.

Renewal engine 325 may further determine whether the renewal received from the user associated with the stored print job is authenticated according to the authentication code, for example, by executing determine authentication instructions 135.

Renewal engine 325 may further, in response to determining that the renewal received from the user associated with the stored print job is authenticated according to the authentication code, renew the stored print job, for example, by executing renew job instructions 140.

In the foregoing detailed description of the disclosure, reference is made to the accompanying drawings that form a part hereof, and in which is shown by way of illustration how examples of the disclosure may be practiced. These examples are described in sufficient detail to allow those of ordinary skill in the art to practice the examples of this disclosure, and it is to be understood that other examples may be utilized and that process, electrical, and/or structural changes may be made without departing from the scope of the present disclosure.

What is claimed is:

1. A non-transitory machine readable medium storing instructions executable by a processor to:
   identify a stored print job as potentially orphaned;
   identify an owner of the stored print job;
   determine when there is a renewal option associated with the stored print job;
   request authorization from the owner to renew the stored print job in response to determining the renewal option is associated with the stored print job; and
   in response to receiving the authorization from the owner to renew the stored print job, determine whether the authorization is authenticated, then renew the stored print job only when the authorization is authenticated.

2. The non-transitory machine readable medium of claim 1, wherein the stored print job comprises a document waiting to be released at a print device.

3. The non-transitory machine readable medium of claim 2, wherein the document is to be released at the print device via receiving an authenticated request to print from the owner.

4. The non-transitory machine readable medium of claim 3, wherein the authenticated request to print from the owner comprises a personal identification number (PIN); and wherein the authorization from the owner to renew the stored print job must comprise the PIN to determine that the authorization from the owner is authenticated.

5. The non-transitory machine readable medium of claim 1, wherein the instructions to identify the stored print job as potentially orphaned comprise instructions to determine if a renewal option is associated with the stored print job; and
   in response to determining that a renewal option is not associated with the stored print job, to delete the stored print job without requesting authorization from the owner to renew the stored print job.

6. The non-transitory machine readable medium of claim 1, wherein the instructions to determine whether the authorization from the owner is authenticated comprise instructions to compare an element of the authorization to a metadata element of the stored print job.

7. The non-transitory machine readable medium of claim 6, wherein the element of the authorization comprises a user generated code.

8. The non-transitory machine readable medium of claim 1, further comprising instructions to, in response to determining that the authorization from the owner is not authenticated, delete the stored print job.

9. The non-transitory machine readable medium of claim 1, wherein the instructions to identify a stored print job as potentially orphaned comprise instructions to determine whether an age of the stored print job is greater than a threshold.

10. The non-transitory machine readable medium of claim 1, wherein the instructions to identify a stored print job as potentially orphaned comprise instructions to determine whether a plurality of requests for the owner to renew the stored print job have been provided to the owner without receiving the authorization from the owner.

11. A method comprising:
   determining whether a stored print job is potentially orphaned;
   in response to determining that the stored print job is potentially orphaned, determining when there is a renewal option associated with the stored print job;
   in response to the renewal option being associated with the stored print job, generating a renewal request from a user associated with the stored print job;
   tracking a quantity of time elapsed subsequently following the renewal request; and
   deleting the stored print job if no renewal is received within the quantity of time.

12. The method of claim 11, wherein determining that the stored print job is potentially orphaned comprises determining that a date associated with the stored print job is older than a threshold age.

13. The method of claim 11, wherein determining that the stored print job is potentially orphaned comprises determining that the stored print job is stored on a first printing device and the stored print job has been printed on a second printing device.

14. The method of claim 11, wherein determining that the stored print job is potentially orphaned comprises determining that an allowable number of copies of the stored print job have been printed.

15. A system, comprising:
   a storage engine to:
      store a print job comprising a plurality of job attributes, wherein the plurality of job attributes comprise a job owner identification, an authentication code, and a renewal option; and
   a renewal engine to:
      identify the stored print job as potentially orphaned according to the renewal option,
      request a renewal from a user associated with the stored print job according to the job owner identification,
      determine whether the renewal received from the user associated with the stored print job is authenticated according to the authentication code, and
      in response to determining that the renewal received from the user associated with the stored print job is authenticated according to the authentication code, renew the stored print job.

\* \* \* \* \*